(12) United States Patent
Brown

(10) Patent No.: US 7,246,752 B2
(45) Date of Patent: Jul. 24, 2007

(54) MAGNETIC STRIPE CARD WITH DYNAMIC NUMBERS

(76) Inventor: Kerry Dennis Brown, 70 Palmer La., Portola Valley, CA (US) 94028

( * ) Notice: Subject to any disclaimer, the term of this patent is extended or adjusted under 35 U.S.C. 154(b) by 0 days.

(21) Appl. No.: 11/414,757

(22) Filed: Apr. 28, 2006

(65) Prior Publication Data

US 2006/0192006 A1    Aug. 31, 2006

Related U.S. Application Data

(63) Continuation of application No. 10/738,376, filed on Dec. 17, 2003, now Pat. No. 7,044,394.

(51) Int. Cl.
*G06K 19/06* (2006.01)
*G06K 5/00* (2006.01)

(52) U.S. Cl. .................. 235/493; 235/492; 235/380

(58) Field of Classification Search ................ 235/493, 235/449; 705/41, 44, 65, 66, 67; 360/241.1, 360/57, 63, 2, 6

See application file for complete search history.

(56) References Cited

U.S. PATENT DOCUMENTS

| | | | | |
|---|---|---|---|---|
| 4,354,100 A * | 10/1982 | Rohen | ................. | 235/449 |
| 5,412,192 A * | 5/1995 | Hoss | ................. | 235/380 |
| 5,623,552 A * | 4/1997 | Lane | ................. | 235/492 |
| 5,907,142 A * | 5/1999 | Kelsey | ................. | 235/380 |
| 6,012,636 A * | 1/2000 | Smith | ................. | 235/380 |
| 6,188,309 B1 * | 2/2001 | Levine | ................. | 235/380 |
| 6,308,890 B1 * | 10/2001 | Cooper | ................. | 235/449 |
| 6,398,115 B2 * | 6/2002 | Krause | ................. | 235/492 |
| 6,592,044 B1 * | 7/2003 | Wong et al. | ................. | 235/493 |
| 2003/0163424 A1 * | 8/2003 | Kumamoto | ................. | 705/41 |
| 2006/0122931 A1 * | 6/2006 | Walker et al. | ................. | 705/39 |

* cited by examiner

*Primary Examiner*—Jared J. Fureman
(74) *Attorney, Agent, or Firm*—Richard B. Main

(57) ABSTRACT

A magnetic stripe card includes a magnetic stripe, a plurality of magnetic write heads, and data circuitry. The magnetic stripe stores magnetic fields indicative of a dynamic number. The plurality of magnetic write heads located under the magnetic stripe generates the magnetic fields to write bits of the dynamic number onto the magnetic stripe. The data circuitry generates the dynamic number and sequentially provides the bits of the dynamic number to the plurality of the magnetic write heads.

7 Claims, 2 Drawing Sheets

MAGNETIC STRIPE CARD WITH DYNAMIC NUMBERS

CROSS-REFERENCE TO RELATED APPLICATIONS

This application is a continuation of U.S. application Ser. No. 10/738,376 filed on Dec. 17, 2003, and entitled "Programmable Magnetic Data Storage Card", now U.S. Pat. No. 7,044,394.

BACKGROUND OF THE INVENTION

1. Field of the Invention

The present invention relates to magnetic data storage, and more particularly to a magnetic stripe card with dynamic numbers.

2. Description of Related Art

Credit card and debit card use and systems have become ubiquitous throughout the world. Originally, credit cards simply carried raised numbers that were transferred to a carbon copy with a card-swiping machine. The merchant simply accepted any card presented. Spending limits and printed lists of lost/stolen cards were ineffective in preventing fraud and other financial losses. So merchants were required to telephone a transaction authorization center to get pre-approval of the transaction. These pre-approvals were initially required only for purchases above a certain threshold, but as time went on the amounts needing authorization dropped lower and lower. The volume of telephone traffic grew too great, and more automated authorization systems allowed faster, easier, and verified transactions. Magnetic stripes on the backs of these payment cards started to appear and that allowed computers to be used at both ends of the call.

The magnetic data on the stripe on the back of payment cards now contains a standardized format and encoding. The raised letters and numbers on the plastic cards are now rarely used or even read. This then gave rise to "skimming" devices that could be used by some unscrupulous merchant employees to electronically scan and save the information from many customers' cards. Reproducing an embossed card complete with photos is then rather easy.

A lot of new technologies are being proposed now to make credit and debit card use more secure at point-of-sale (POS) locations. Many propose the use of smart cards that wirelessly communicate two ways with merchant POS terminals. The data and authorizations are very secure, as it's encrypted and two-way, but the implementation worldwide would require the replacement of millions of magnetic stripe card readers. Something that is very unlikely to happen anytime soon. So, what is needed is a way to increase the security of payment card use at merchant POS locations, but not necessitate the deployment of new card scanners.

SUMMARY OF THE INVENTION

The above problems are addressed by providing a magnetic stripe card with dynamic numbers. A card includes a magnetic stripe, a plurality of magnetic write heads, and data circuitry. The magnetic stripe stores magnetic fields indicative of a dynamic number. The plurality of magnetic write heads located under the magnetic stripe generates the magnetic fields to write bits of the dynamic number onto the magnetic stripe. The data circuitry generates the dynamic number and sequentially provides the bits of the dynamic number to the plurality of the magnetic write heads.

The magnetic write heads may include a core and coils wrapped around the core. The magnetic write heads may generate the magnetic fields to write bits of the dynamic number onto the magnetic stripe by providing current through the coils. The magnetic stripe may also demagnetize to remove the magnetic fields indicative of the dynamic number. The data circuitry can perform cryptography to generate the dynamic number. The data circuitry may comprise a data receptor that receives data to generate the dynamic number. In some embodiments, the detector detects a swipe of the card. The dynamic number may comprise an incrementing usage number. The portion of the magnetic stripe may also store a fixed number. The magnetic stripe, the magnetic write heads, and the data circuitry may be placed in plastic to form the card.

A method for operating a card includes a step of storing magnetic fields indicative of a dynamic number in a magnetic stripe. The method also includes a step of in a plurality of magnetic write heads located under the magnetic stripe, generating the magnetic fields to write bits of the dynamic number onto the magnetic stripe. The method includes generating the dynamic number using the data circuitry and sequentially providing the bits of the dynamic number to the plurality of the magnetic write heads using the data circuitry.

DETAILED DESCRIPTION OF THE INVENTION

Figure 1:
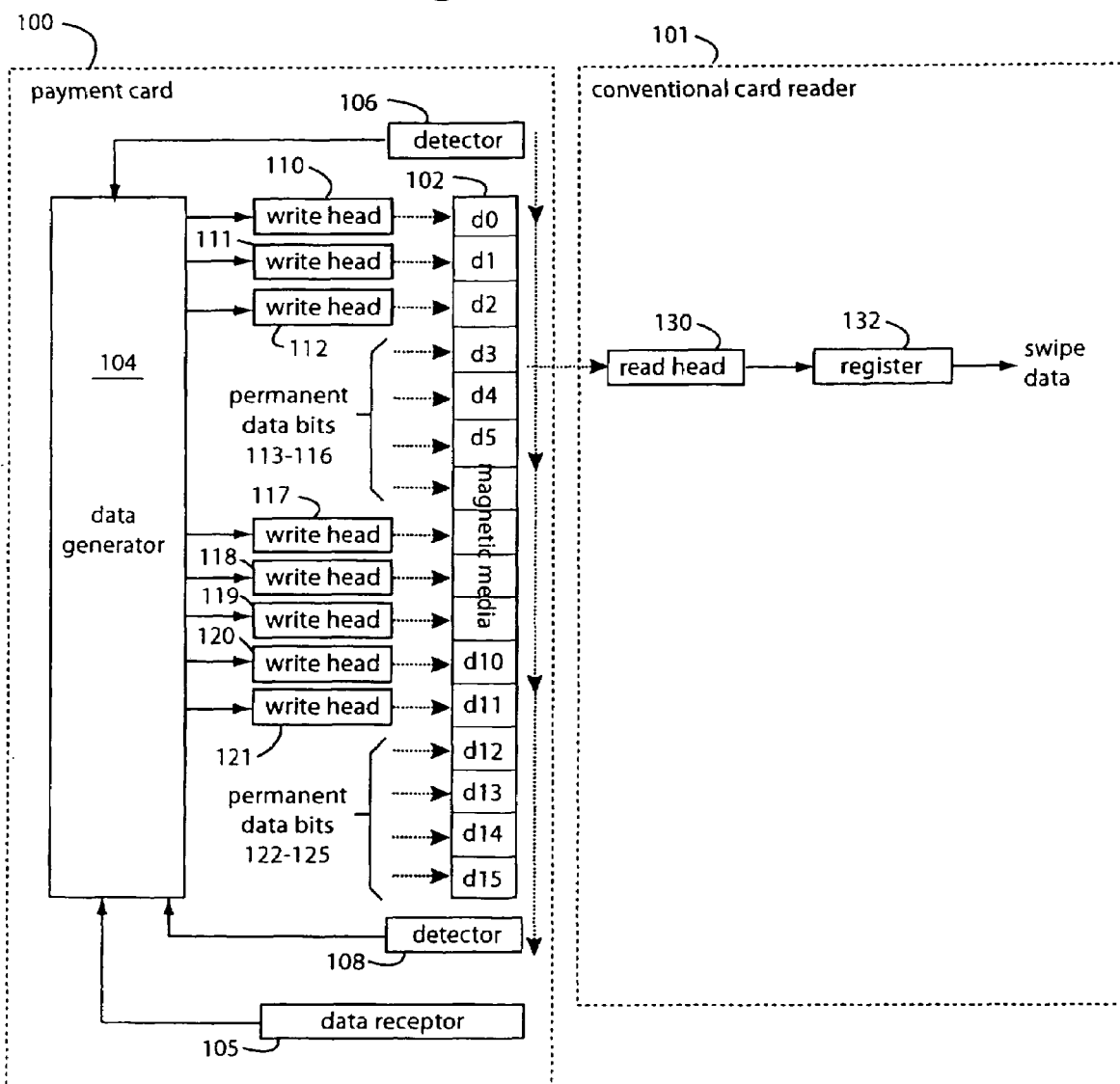
FIG. 1 is a functional block diagram of a payment card embodiment of the present invention.

FIG. 1 illustrates a payment card embodiment of the present invention, and is referred to herein by the general reference numeral 100. A conventional merchant point-of-sale magnetic-stripe card reader 101 is used to read user account data recorded on a magnetic stripe 102 on the payment card 100. Such is used by a merchant in a traditional way, the payment card 100 appears and functions like an ordinary debit, credit, loyalty, prepay, and similar cards with a magnetic stripe on the back.

User account data is recorded on the magnetic stripe 102 using industry-standard formats and encoding. For example, ISO-7810, ISO-7811(−1:6), and ISO-7813, available from American National Standards Institute (NYC, N.Y.). These standards specify the physical characteristics of the cards, embossing, low-coercivity magnetic stripe media characteristics, location of embossed characters, location of data tracks 1-3, high-coercivity magnetic stripe media characteristics, and financial transaction cards. A typical Track-1, as defined by the International Air Transport Association (IATA), is seventy-nine alphanumeric 7-bit characters recorded at 210-bits-per-inch (bpi) with 7-bit encoding, Track-2, as defined by the American Bankers Association (ABA), is forty numeric characters at 75-bpi with 5-bit encoding, and Track-3 (ISO-4909) is typically one hundred and seven numeric characters at 210-bpi with 5-bit encoding. Each track has starting and ending sentinels, and a longitudinal redundancy check character (LRC). The Track-1 format includes user primary account information, user name, expiration date, service code, and discretionary data. These tracks conform to the ISO/IEC Standards 7810, 7811-1-6, and 7813, or other suitable formats.

The magnetic stripe 102 is located on the back surface of payment card 100. A data generator 104, e.g., implemented with a microprocessor, receives its initial programming and personalization data from a data receptor 105. For example, such data receptor 105 can be implemented as a serial inductor placed under the magnetic stripe which is excited by a standard magnetic card writer. The data received is stored in non-volatile memory. Alternatively, the data receptor 105 can be a radio frequency antenna and receiver, typical to ISO/IEC Specifications 14443 and 15693. The data generator 104 may be part of a secure processor that can do cryptographic processing, similar to Europay-Mastercard-Visa (EMV) cryptoprocessors used in prior art "smart cards".

Card-swipes generate detection sensing signals from a pair of detectors 106 and 108. These are embedded at each end of magnetic stripe 102 and can sense the typical pressure applied by a magnetic read head in a scanner. A first set of magnetic-transducer write heads 110-112 are located immediately under bit positions d0-d2 of magnetic stripe 102. The data values of these bits can be controlled by data generator 104. Therefore, bit positions d0-d2 are programmable.

Such set of magnetic-transducer write heads 110-112 constitutes an array that can be fabricated as a single device and applied in many other applications besides payment cards. Embodiments of the present invention combine parallel fixed-position write heads on one side of a thin, planar magnetic media, and a moving serial read head on the opposite side. Such operation resembles a parallel-in, serial-out shift register.

A next set of bit positions 113-116 (d3-d6) of magnetic stripe 102 are fixed, and not programmable by data generator 104. A conventional card programmer is used by the card issuer to fix these data bits. A second set of magnetic write heads 117-121 are located under bit positions d7-d11 of magnetic stripe 102. The data values of these bits can also be controlled by data generator 104 and are therefore programmable. A last set of bit positions 122-125 (d12-d15) of magnetic stripe 102 are fixed, and not programmable by data generator 104. In alternative embodiments of the present invention, as few as one bit is programmable with a corresponding write head connected to data generator 104, or as many as all of the bits in all of the tracks.

The card reader 101 is a conventional commercial unit as are already typically deployed throughout the world in the millions. It is an important aspect of the present invention that the outward use of the payment card 100 not require any modification of the behavior of the user, nor require any special types of card readers 101. Such is a distinguishing characteristic and a principle reason that embodiments of the present invention would be commercially successful. The card reader 101 has a magnetic-transducer read head 130 that is manually translated along the length of data stripe 102. It serially reads data bits d0-d15 and these are converted to parallel digital data by a register 132.

The magnetic-transducer write heads 110-112 and 117-121 must be very thin and small, as they must fit within the relatively thin body of a plastic payment card, and be packed dense enough to conform to the standard recording bit densities. Integrated combinations of micro-electro-mechanical systems (MEMS) nanotechnology, and longitudinal and perpendicular ferromagnetics are therefore useful in implementations that use standard semiconductor and magnetic recording thin-film technologies.

Figure 2:
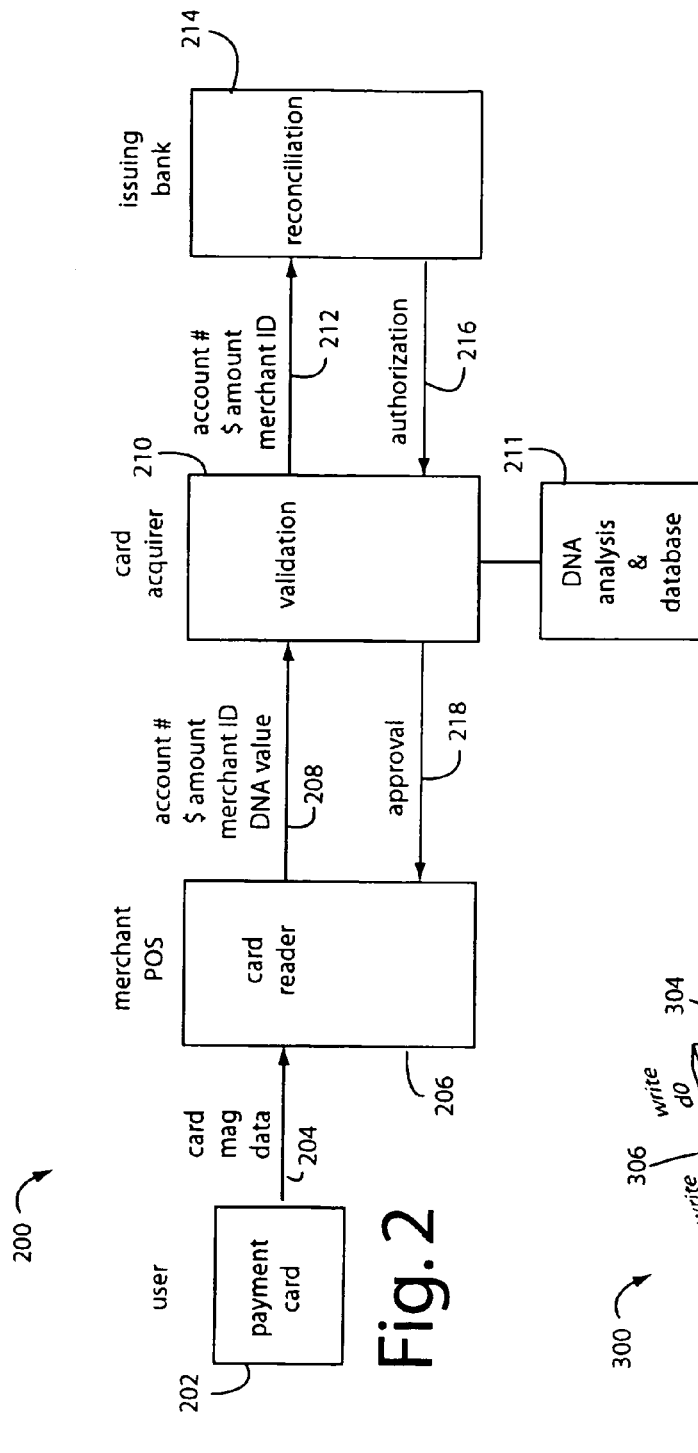
FIG. 2 is a functional block diagram of a user payment processing system embodiment of the present invention.

FIG. 2 illustrates a payment card processing system embodiment of the present invention, and is referred to herein by the general reference numeral 200. The system 200 uses a payment card 202 that is very similar to payment card 100 (FIG. 1). That is, payment card 202 is able to change its magnetic card data 204 that will be elicited by a card reader 206.

In one embodiment of the present invention, payment card 202 is able to change its magnetic card data 204 to conform to a particular issuing bank or system, e.g., Euro-Pay, MasterCard, or VISA. The user then need only to carry a single physical card to access all the user's accounts. There is some reluctance on the part of individual competitors, because brand identity is diminished or lost in such a plan.

In some embodiments of the present invention, the payment card is 202 constructed to provide an automatically incrementing usage number that can be forwarded in an approval request message 208 to a validation processing center 210. The validation processing center stores the last incrementing usage-number used in a valid transaction and any new usage-number used must be greater. If it is not, an out-of-sequence transaction has been detected that is probably the result of card skimming and fraud. The transaction request is subsequently denied.

Alternatively, such dynamic number may be a unique algorithm composed of 2 or more factors that may include the user's billing address numbers and social security number or card numbers that provide unpredictable results not in a sequential manner. The Assignee refers to such commercial analysis methods and devices with its trademark, Dynamic Numerical Analysis (DNA™).

One way to implement this test is with a dynamic numerical analysis (DNA). In FIG. 2, this is shown as DNA analysis and database 211. An algorithm is implemented that fetches the last used valid number from a private database, and compares this with the sequence number now being attempted.

In other embodiments of the present invention, the payment card 202 is constructed to provide a sort of PIN value that can be forwarded in an approval request message 208 to a validation processing center 210. In one instance, a unique number generator internal to the card is used to supply a value in the discretionary field of Track-2, or the card validation code (CVC) field. Such unique number is generated by an algorithm that uses as its factors the user's social security number, the user's billing address, etc.

The payment card 202 can also be constructed to provide user account data for only limited times. For example, a PIN pad integrated on the payment card 202 can require a user PIN number to be entered before card magnetic data 204 will present itself for swiping in the card reader 206. A lack of card magnetic data 204 simply looks to card reader 206 as a defective card, and denies the transaction. No hardware or software changes are needed in the card reader 206 to implement system 200. Therefore, card reader 206 can be an already preexisting conventional device.

The card reader 206 performs various magnetic data operations and checks on the card magnetic data 204. For example, a longitudinal redundancy code (LRC) check that helps assure a valid read of all the data has been made. Once the card reader 206 has determined the card magnetic data 204 is good, an approval request message 208 is sent to a card acquirer 210. Such message includes the user account number, dollar amount of the transaction, and merchant identification (ID). It further contains special transaction serializing information to detect skimming and other fraud. The validation processing center 210 provides regional high speed network servers that are often operated by third parties and not the issuing banks.

The validation processing center 210 checks to see if the user card 202 is not stolen or lost, and other first level account validation. It may also have cached some information from an issuing bank about this user account if the account has been processed before very recently. A card acquirer approval message 212 is sent to an issuing bank 214. It also includes the user account number, dollar amount of the transaction, and merchant identification (ID). The user account is checked to see if adequate funds are available, and if so, sends an authorization message 216. A reconciliation of the user account is made and the merchant's account is credited with a day or two. The card acquirer 210 records the issuing-bank authorization and forwards an approval message 218. The merchant point-of-sale card reader 206 displays the approval and an authorization code, and the transaction is completed.

Figure 3:
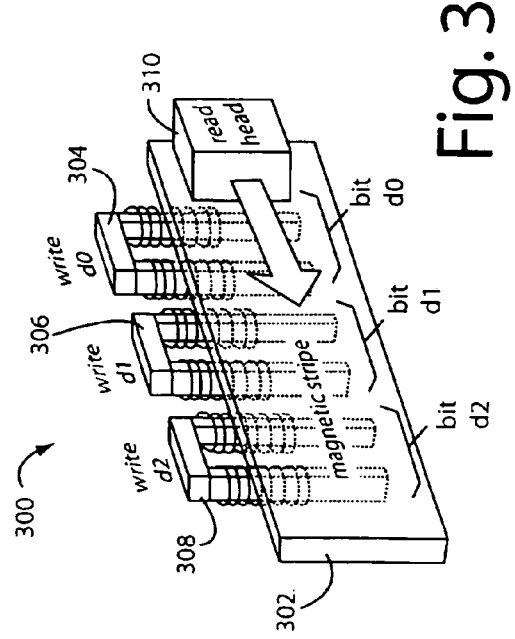
FIG. 3 is a perspective diagram of a magnetic data storage array embodiment of the present invention.

FIG. 3 illustrates a magnetic data storage array embodiment of the present invention, and is referred to by the general reference numeral 300. The magnetic data storage array 300 is based on a magnetic stripe 302, e.g., as is commonly found on the backs of credit cards, debit cards, access cards, and drivers licenses. Such can also be a two dimensional array, and not just a single track. Here, magnetic data bits d0-d2 are arranged in a single track. A set of fixed-position write heads 304, 306, and 308 respectively write and rewrite magnetic data bits d0-d2. A moving, scanning read head 310 is used to read out the data written.

Parts of magnetic data storage array 300 can be implemented with MEMS technology. In general, MEMS is the integration of mechanical elements, sensors, actuators, and electronics on a common substrate using microfabrication technology. Electronics devices are typically fabricated with CMOS, bipolar, or BICMOS integrated circuit processes. Micromechanical components can be fabricated using compatible "micromachining" processes that selectively etch away parts of a processing wafer, or add new structural layers to form mechanical and electromechanical devices.

In the present case, MEMS technology can be used to fabricate coils that wind around Permalloy magnetic cores with gaps to produce very tiny magnetic transducer write heads. For example, a magnetic transducer write head that would be useful in the payment card 100 of FIG. 1 would have a gap length of 1-50 microns, a core length of 100-250 microns, a write track width of 1000-2500 microns, and a read track width of 1000 microns. Nickel-iron core media permeability would be greater than 2000, and cobalt-platinum or gamma ferric oxide media permeability would be greater than 2.0, and the media coercivity would be a minimum of 300 Oe.

A parallel array static MEMS (S-MEMS) device is a magnetic transducer which will allow information to be written in-situ on the data tracks of a standard form factor magnetic stripe card. In a practical application, an array of twenty-five individual magnetic bit cells can be located at one end of an ISO/IEC 7811 standard magnetic media. Such a stripe includes some permanent encoding, as well as a region in which data patterns can be written by arrays of magnetic heads attached to a low-coercivity magnetic stripe.

Each cell of such parallel array is independently electronically addressed. Write transducer current flows in one direction or the other, depending on the desired polarity of the magnetic data bits. A prototype write head included a high permeability NiFe core with electroplated windings of copper wires. For example, a useful write head has a z-dimension (track width) of 1000-2500 microns, a width of 100 microns in the x-direction, and a height in the y-direction of approximately 20 microns. There are four coil turns around each pole piece, for a total of eight. The cross sectional area of the coil was estimated at four microns square, with a three micron spacing. Total length in the x-direction, including core and coils, was 150 microns, and about a ten micron spacing between adjacent magnetic cells.

A higher flux version of such head has two layers of coils, allowing an increase in the number of turns, as well as more turns closer to the pole pieces. Such a two-layer structure increases the magnetic flux density of the head for a given write current, and was selected for working device prototype. An initial design called for a grouping of twenty-five cells per device chip and deposited on a silicon substrate.

Some calculations were made to see if the size constraints would be consistent with a magnetic transducer that can perform adequately in the applications described here for payment cards. In a first approximation, the write head could be considered as a simple ring head, with a field gap $H_g$ given by:

$$H_g = nI/l_g \qquad (1)$$

where n is the number of coil turns, I is the write current, and $l_g$ the gap length. In this model, $H_g$ is determined by only three parameters, and Table I shows the values of the magnetic field expected in the gap based on the values of n, I, and $l_g$.

TABLE I

Initial Estimates of Gap Fields

| Number of Layers | Number of Turns | Current (mA) | Gap Length, $l_g$ (microns) | Gap Field (kA/m) | Gap Field (Oe) |
|---|---|---|---|---|---|
| 1 | 8 | 10 | 4 | 20 | 251 |
|   |   |    | 1 | 80 | 1005 |
|   |   | 15 | 4 | 30 | 378 |
|   |   |    | 1 | 120 | 1508 |
|   |   | 20 | 4 | 40 | 502 |
|   |   |    | 1 | 160 | 2010 |
| 2 | 16 | 10 | 4 | 40 | 502 |
|   |   |    | 1 | 160 | 2010 |
|   |   | 15 | 4 | 60 | 754 |
|   |   |    | 1 | 240 | 3015 |
|   |   | 20 | 4 | 80 | 1005 |
|   |   |    | 1 | 320 | 4020 |

Table I indicates that a gap length of one micron should yield sufficient gap fields. This is based on a first approximation criteria that the gap field should equal three times the coercivity of the media. E.g., a gap field of roughly 1000 Oe. However, a better and more accurate understanding of the gap field actually anticipated here is obtained by calculating the head efficiency function. Such function considers the permeability of the core material, the permeability of air, and the distance that magnetic flux travels around the core before reaching the air gap. The calculation can be done with reference to the magnetic reluctances around the path that magnetic flux travels before it exits the head at the front gap.

In this lumped element model, $$\eta = \text{head efficiency} = \frac{R_g}{R_g + R_1 + 2R_2 + 2R_3} \quad (2)$$

$$\eta = \text{head efficiency} = \frac{l_g / A_g \mu_0}{l_g / A_g \mu_0 + l_1 / A_1 \mu_1 + 2l_2 / A_2 \mu_2 + 2l_3 / A_3 \mu_3} \quad (3)$$

Assuming here:

$\mu_1 = \mu_3 = 2000$ (assumes NiFe Permalloy annealed in a magnetic field)

$\mu_2 = 500$ (assumes Permalloy, where annealing in a magnetic field is not done)

$\mu_0 = 1$ (permeability of air=1 in CGS system)

From the dimensions of the model:

$l_g$ = gap length = 1 micron;

$l_1 = 100$ micron;

$l_2 = 10$ micron;

$l_3 = 49.5$ micron $A_g = 4000 \text{um}^2$ $A_1 = 5000 \text{um}^2$ $A_2 = 5000 \text{um}^2$ $A_3 = 4000 \text{um}^2$ Inserting these values into Equation (3) yields a head efficiency function of:

$$\eta = 0.892 = 89.2\% \quad (4)$$

For a two-layer design, the value of $l_2$ increases to twenty microns, and the efficiency is:

$$\eta = 0.867 = 86.7\% \quad (5)$$

Using the values of η obtained, the effective values of the Gap Field, Hg' are recalculated in Table II.

TABLE II

Effective Gap Fields Considering Writing Efficiency

| Layers | Turns | I (mA) | Gap Length, 1 g (microns) | Core Length (microns) | Hg, Gap Field (kA/m) | Hg, Gap Field (Oe) | Efficiency η | Hg' Effective Gap Field (kA/m) | Hg' Effective Gap Field (Oe) |
|---|---|---|---|---|---|---|---|---|---|
| 1 | 8 | 10 | 1 | 219 | 80 | 1006 | 0.892 | 71.4 | 897.5 |
|   |   | 15 |   |     | 120 | 1508 |       | 107.0 | 1345.0 |
|   |   | 20 |   |     | 160 | 2011 |       | 142.7 | 1793.7 |
|   |   | 30 |   |     | 240 | 3017 |       | 214.1 | 2691.2 |
| 2 | 16 | 10 | 1 | 239 | 160 | 2011 | 0.867 | 138.7 | 1743.7 |
|   |   | 15 |   |     | 240 | 3017 |       | 208.1 | 2615.8 |
|   |   | 20 |   |     | 320 | 4022 |       | 277.4 | 3489.7 |

Table-II indicates several combinations of one and two layer designs with different write currents that can meet the requirements. Any electromagnetic field coupling between coils and core diminishes as the distance from the coil to the core increases. The outer turns of the coil are not as efficient as the inner turns, and so it would be better to have eight turns in two layers than to have those eight turns in one layer. From the manufacturing point of view, it is easier to make more turns on a pancake coil than to make additional layers of turns, although alternative embodiments could include vertically sequenced single layer coils.

A flux linkage efficiency of 0.52 is based on the assumption that the closest coil will have an efficiency of 1.0 and any successive coils will decrease linearly outward from the core. Successive coils couple at 1.0, 0.5, 0.33, and 0.25 efficiency, respectively. It is likely that the actual efficiency will be greater than this value, but if we accept this conservative estimate, the values in Table-II will be reduced to those shown in Table-III.

For a value of $H_g$=1100G, at a distance of y=0.5 micron, for g=1 micron (y=g/2), approximate peak field values are:

$$H_x(0, 0.5) = 550G \tag{10}$$

$$H_y(xo, 0.5) = 309G \tag{11}$$

The fields in both the x and y directions are thus calculated to be in excess of the 300 Oe switching field required in ISO 7811-2 by the so-called low coercivity, or "Lo-Co" media. The magnetization in the magstripe can therefore be switched from one orientation to another under application of such a field.

By attaching the input signal lines of a writer to a shift register, a coded signal can be sequentially written to the desired cells in a parallel array. These cells will then magnetize the low coercivity medium that is permanently affixed to the writer, and the magnetization of the media will persist after the current is turned off from the power supply.

TABLE III

Gap Fields after Considering Flux Linkage Efficiency

| Layers | Turns | I (mA) | Gap Length, 1 g (microns) | Core Length (microns) | Hg' Effective Gap Field (kA/m) | Hg' Effective Gap Field (Oe) | Hg with flux linkage considered (kA/m) | Hg with flux linkage considered (Oe) |
|---|---|---|---|---|---|---|---|---|
| 1 | 8 | 10 | 1 | 219 | 71.4 | 897.5 | 37.1 | 466.7 |
|   |   | 15 |   |   | 107.0 | 1345.0 | 55.6 | 699.4 |
|   |   | 20 |   |   | 142.7 | 1793.7 | 74.2 | 932.7 |
|   |   | 30 |   |   | 214.1 | 2691.2 | 111.3 | 1399.4 |
| 2 | 16 | 10 | 1 | 239 | 138.7 | 1743.7 | 72.1 | 906.7 |
|   |   | 15 |   |   | 208.1 | 2615.8 | 108.2 | 1360.2 |
|   |   | 20 |   |   | 277.4 | 3489.7 | 144.2 | 1814.6 |

Table-III shows the equivalence between a single layer structure with eight or more turns, and a write current of 20-30 mA, and a double layer structure with sixteen or more turns and a current of 10-15 mA. Such values can be verified to produce the required magnetic flux, by considering the write field distribution.

A general method for determining the head field distribution is to follow the well-known Karlqvist Writing Model:

$$H_x = \frac{H_g}{\Pi}\left[\arctan\frac{g/2+x}{y} + \arctan\frac{g/2-x}{y}\right] \tag{6}$$

$$H_x = \frac{-H_g}{\Pi}\left[\ln\frac{(g/2+x)^2 + y^2}{(g/2-x)^2 + y^2}\right] \tag{7}$$

The maximum or peak field values are approximated by:

$$H_x(0, y) = 2\frac{H_g}{\Pi}\arctan\left(\frac{g}{2y}\right) \tag{8}$$

and, $$H_y(x_0, y) = \frac{-H_g}{\Pi}\ln\frac{(g/2+x)^2 + y^2}{(g/2-x)^2 + y^2} \tag{9}$$

where $x_o^2 = (g/2)^2 + y^2$

Individual bits can then be de-magnetized after a preset amount of time, assuring that the information stored on the magstripe cannot be copied for fraudulent or unintended use.

The embodiments described here can be mathematically substantiated to produce a sufficient magnetic flux to write to a low coercivity media. They are also compatible with standard manufacturing materials and processes. In particular, companies and wafer fabs that have prior experience in the production of magnetic heads for tape drives, disk drives, and audio and video recording equipment will already have much of the in-house experience in design, masking, and deposition required to manufacture such devices. Current estimates are that, in volumes of 100K units or more per month, a 25-cell parallel array device could be manufactured for $0.95-$1.45. An optimized single-layer device should be even less expensive. It is thus entirely feasible to consider this technology for the consumer credit card market.

In a business model method embodiment of the present invention, a current usage-counter number on the magnetic stripe of a user payment card is incremented each time the card is swiped. For example, a sequential or unique number generating algorithm executing on the payment card matches a similar one at the card acquirer processing center. A last validly used usage-counter number is maintained by a payment authorization center for each particular user. Each transaction presented for authorization is checked to see if the current usage-counter number exceeds the last validly used usage-counter number. If it does not, the transaction is declined.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A user access card, comprising:

a magnetic stripe for supporting permanently recorded magnetic data bits along data tracks on a exposed surface of a card that can be read by a card reader access device;

a plurality of magnetic-transducer write heads particularly located under at least one of a plurality of recording data bit positions disposed along said data tracks in the magnetic stripe;

a data generator connected to the plurality of magnetic-transducer write heads and providing for autonomous dynamic control of magnetic data bit values associated with individual particular ones of said plurality of recording data bit positions;

a detector disposed in the magnetic stripe and providing for an automatic trigger to the data generator to produce new data bit values and for the plurality of magnetic-transducer write heads to record such as magnetic recording data bits;

wherein, a complete user access number can be recorded in parallel as a mixture of permanent and dynamic magnetic recording data bits that are readable in serial by said card reader access device.

2. The magnetic stripe card of claim 1, further comprising:

a single array in which are disposed all of said magnetic-transducer write heads.

3. The magnetic stripe card of claim 1, further comprising:

a plurality of crypto numbers supplied to the data generator to constitute a dynamic portion of the user account number.

4. The magnetic stripe card of claim 1, further comprising:

a unique usage-counter number generated on the magnetic stripe to match a parallel number maintained at a card acquirer processing center.

5. An access card processing system, comprising:

a card reader access device for serially reading magnetic data and formulating an approval request message;

a validation processing center for storing a last incrementing usage number and for receiving said approval request message, and for generating a card acquirer approval message;

an issuing bank for receiving said card acquirer approval message, and for authorizing a transaction by a user with a dynamic numerical analysis;

an access card with a magnetic stripe for supporting permanently recorded magnetic data bits along data tracks on a exposed surface of a card that can be read by said card reader access device, and a plurality of magnetic-transducer write heads particularly located under at least one of a plurality of recording data bit positions disposed along said data tracks in the magnetic stripe; and a dynamic number encoded in said approval request message by said plurality of magnetic-transducer write heads for communication through the card reader access device to the validation processing center.

6. The access card system of claim 5, wherein:

said validation processing center provides for storing a last incrementing usage number and for detecting an out-of-sequence transaction.

7. The access card system of claim 5, wherein:

the dynamic number includes a unique algorithm composed of at least two factors that include data related to a user in order to provide unpredictable results not in a sequential manner.

* * * * *